(No Model.)
A. ANGELL.
ATTACHMENT FOR FISH HOOKS.
No. 456,931. Patented Aug. 4, 1891.
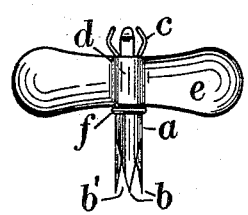
Fig.1.
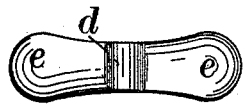
Fig.4.
Fig.6.
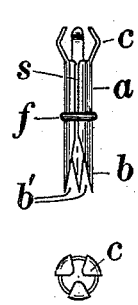
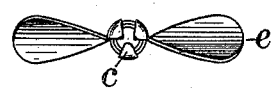
Fig.2.
Fig.5.
Fig.7.
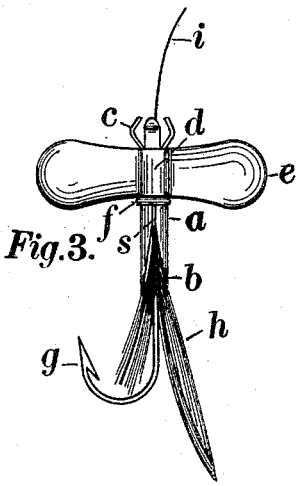
Fig.3.
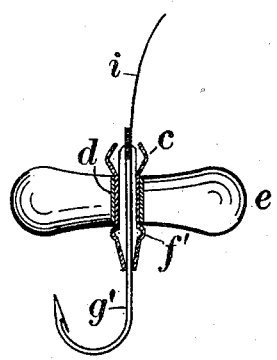
Fig.8.
Attest.
L. Lee.
J. Van Hest Jr.
Inventor.
Albert Angell, per
Cranes Miller, attys.
THE NORRIS PETERS CO., PHOTO-LITHO., WASHINGTON, D. C.

UNITED STATES PATENT OFFICE.

ALBERT ANGELL, OF EAST ORANGE, NEW JERSEY.

ATTACHMENT FOR FISH-HOOKS.

SPECIFICATION forming part of Letters Patent No. 456,931, dated August 4, 1891.

Application filed October 2, 1890. Serial No. 366,817. (No model.)

*To all whom it may concern:*

Be it known that I, ALBERT ANGELL, a citizen of the United States, residing at East Orange, Essex county, New Jersey, have invented certain new and useful Improvements in Attachments for Fish-Hooks, fully described and represented in the following specification and the accompanying drawings, forming a part of the same.

The object of my present invention is to furnish an attachment for fish-hooks, especially for fly-hooks, by which they may be provided with one or more revolving wings to attract the attention of the fish.

In my invention a tubular sleeve is provided with shoulders to retain a hub or eye rotary thereon, to which hub one or more wings may be secured to revolve around the sleeve. The sleeve when used with fly-hooks is adapted to slip over the shank of the hook and to press upon the wings and body of the fly with sufficient friction to retain it in place, and the rotary wing or wings are thus secured upon the fly while in use.

My invention is an attachment adapted for manufacture or sale apart from the hooks or flies already in use.

By my present improvement I adapt the rotary wing portion for application to any of the flies already possessed by fishermen, and thereby greatly increase the utility and application of my invention.

My improvement will be understood by reference to the annexed drawings, in which the parts are shown upon an exaggerated scale to clearly exhibit the construction.

Figure 1 is a side view of the body and wings complete in readiness for application to a fly-hook. Fig. 2 is a plan of the same. Fig. 3 is a side view of a fly-hook with my improvement applied thereto. Fig. 4 is a side view, and Fig. 5 a plan, of the body alone. Fig. 6 is a side view, and Fig. 7 a plan, of the wing portion alone; and Fig. 8 is a side view showing a plain hook with my improvement applied to its shank, with the body portion and hub of the wing portion in section where hatched.

The body portion is shown with a tubular sleeve $a$, prongs $b$ at its lower end, and lugs $c$ at its upper end. The wing portion consists in a hub or eye $d$, fitted to the sleeve $a$, and provided with one or more spiral or slanting wings $e$. The hub is fitted to turn freely between shoulders upon the sleeve $a$ and is held from end movement by a collar $f$, adjacent to the prongs $b$, and by the lug $c$, which are bent outward, as shown in the drawings, after the hub is applied thereto. The lugs are curved inwardly at their free ends to form a sort of rounded head upon the body, and the lugs and collar $f$ form the shoulders between which the hub or eye revolves.

In Fig. 3, $g$ is the fish-hook, and $h$ the trimmings secured thereon to form an attractive fly. Such trimmings, consisting of feathers, hair, and other suitable material, are usually attached to the upper end of the hook and spread outwardly in a suitable manner to imitate the wings and tail of an insect. The sleeve $a$, which represents the body of the insect in my present invention, is designed to slip over the snell and to clamp elastically upon the upper portion of such trimmings, thereby providing the fly-hook with a pair of spinning wings, which greatly increase its attractiveness to the fish. If a plain cylindrical sleeve were slipped over the snell (shown at $i$ in Fig. 3) and pushed down over the shank of the hook $g$, it would operate to press the trimmings together into a small bunch, and thus displace them from their natural relation to the hook. To avoid such an effect the prongs $b$ are of tapering form with intervening spaces $b'$, and are thus adapted, as shown in Fig. 3, to penetrate among the feathers or hairs of which the artificial fly is formed, so as to permit their divergence in a natural manner. The body is formed of thin sheet metal, so that the prongs have more or less elasticity, and are thus adapted to hold the body and rotary wings in place upon the shank of the hook, while they are equally adapted to slip off without resistance, so that the attachment may be applied to another "fly." The present construction also permits the same attachment to be used upon a hook without any trimmings, as shown in Fig. 8, where the prongs $b$ are bent inward to grasp the shank $g'$ elastically. With this construction the body can be readily attached to or removed from any hook and the same attachment can be applied to any number of hooks in succession where the fisherman finds it desirable to change the style of his hook.

The collar $f$ is shown in Figs. 1, 3, and 4 as a small band of wire secured upon the body by the elasticity of the sleeve, which is split by a longitudinal division $s$ to give it an elastic character. Such construction is exceedingly cheap and effective; but a collar may also be formed by pressing the sleeve into the desired shape, as shown at $f'$ in Fig. 8.

From the above description it will be understood that the essential part of my invention is the combination of the detachable tubular sleeve and the wings rotary thereon and adapted for application to and removal from the hook at pleasure.

The attachment is retained detachably upon the shank of the hook by the elasticity of the fly-trimmings or of some portion of the body adapted to spring over the shank where no trimmings are employed.

An important feature of my improvement also consists in the tapering prongs $b$, with intermediate spaces $b'$ to fit over the trimmings where the attachment is designed for use with artificial "flies."

The attachment when made with the prongs $b$ is, however, equally adapted for use with ordinary hooks, as the prongs $b$ may be readily bent inward, so as to grasp the shank of the hook elastically, as shown in Fig. 8. The attachment is thus secured to the hook elastically by the prongs, which is substantially the case where the prongs are fitted over the trimmings upon an artificial fly.

Although I have claimed the details of construction in the preferred form of my invention, the construction may be varied materially, if desired.

As my attachment is designed to be sold apart from the hook, I have claimed it as a new article of manufacture.

It is evident that the article may be made in a variety of colors by treating the sheet metal of which they are made with acids or by coating the same with suitable coloring substances in order to give them an appearance more nearly resembling the insects which they are designed to imitate.

A single wing bent in any suitable direction to make it spin around the sleeve $a$ would present nearly the same appearance in the water as a pair of wings, as it would glitter and produce the sparkling appearance that my invention is designed to create in connection with the moving fly. A pair of wings is, however, preferable, as it balances the strain upon the hub or band, by which the wing is pivoted upon the sleeve, and thus secures a greater freedom of movement.

I am aware that in United States Patent No. 271,424, granted January 30, 1883, an artificial bait is described with independently-rotating fins or wings; but such wings are a permanent attachment of the bait and cannot be removed from the hook, as in my construction. They also differ from my invention in not revolving upon the body of the bait around the shank of the hook, but in revolving upon axes independent of the shank and projected laterally therefrom. I hereby disclaim such patent, as my invention consists in a sleeve having a wing portion fitted to revolve upon the same, the whole attachment being removable from the fish-hook at pleasure.

Having thus set forth the nature of my invention, what I claim is—

1. The attachment for fish-hooks, consisting in the sleeve $a$, having the flexible prongs $b$, and the hub $d$, fitted to the said sleeve and provided with one or more wings to revolve the hub thereon, as and for the purpose set forth.

2. The attachment for fish-hooks, consisting in the sleeve $a$, having the flexible prongs $b$, the collar $f$, and lug $c$, and the hub $d$, provided with the wings $e$ and fitted to the sleeve between the collar $f$ and lugs $c$ to revolve thereon, substantially as herein set forth.

In testimony whereof I have hereunto set my hand in the presence of two subscribing witnesses.

ALBERT ANGELL.

Witnesses:
 L. LEE,
 H. J. MILLER.